(12) United States Patent
Chen et al.

(10) Patent No.: US 6,897,446 B2
(45) Date of Patent: May 24, 2005

(54) METHOD AND SYSTEM FOR TARGET DETECTION USING AN INFRA-RED SENSOR

(75) Inventors: Hai-Wen Chen, Orlando, FL (US); Steven R. Frey, Jr., Orlando, FL (US); Teresa L. Olson, Winter Garden, FL (US)

(73) Assignee: Lockheed Martin Corporation, Orlando, FL (US)

( * ) Notice: Subject to any disclaimer, the term of this patent is extended or adjusted under 35 U.S.C. 154(b) by 181 days.

(21) Appl. No.: 10/395,264

(22) Filed: Mar. 25, 2003

(65) Prior Publication Data

US 2003/0183765 A1 Oct. 2, 2003

Related U.S. Application Data

(60) Provisional application No. 60/367,282, filed on Mar. 26, 2002.

(51) Int. Cl.$^7$ ................................................ G06T 1/00
(52) U.S. Cl. ......................................................... 250/330
(58) Field of Search ........................ 244/3.16; 702/191; 250/330; 342/52, 53, 54, 90, 195, 25, 161, 162

(56) References Cited

U.S. PATENT DOCUMENTS 4,615,496 A * 10/1986 Pinson ...................... 244/3.16

* cited by examiner

*Primary Examiner*—David Porta
*Assistant Examiner*—Marcus Taningco
(74) *Attorney, Agent, or Firm*—Birch, Stewart, Kolasch & Birch, LLP

(57) ABSTRACT

A target detection and tracking system provides dynamic changing of the integration time (IT) for the system IR sensor within a discrete set of values to maintain a high sensor sensitivity. The system changes the integration time to the same or a different sensor integration time within the discrete set based on the image data output from the sensor satisfying pre-determined system parameter thresholds. The system includes an IT-related saturation prediction function allowing the system to avoid unnecessary system saturation when determining whether an IT change should be made. The tracking portion of the system provides tracking feedback allowing target objects with a low sensor signature to be detected without being obscured by nearby uninterested objects that produce system saturation.

26 Claims, 12 Drawing Sheets

R=3.62km
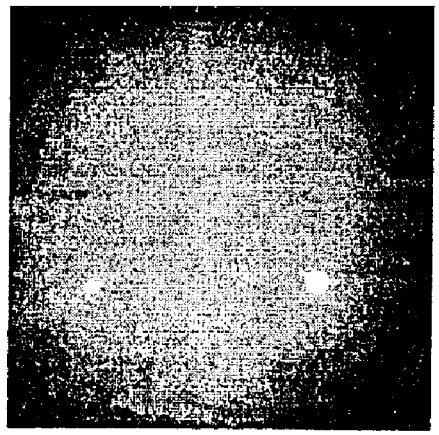
R=3.33km
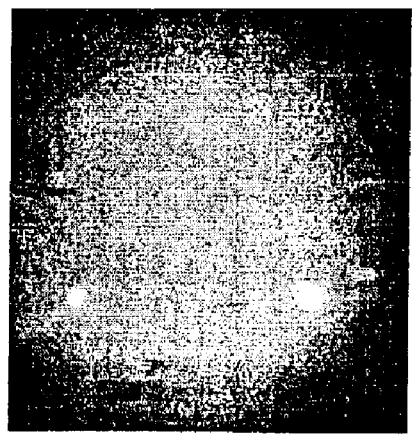
R=2.15km
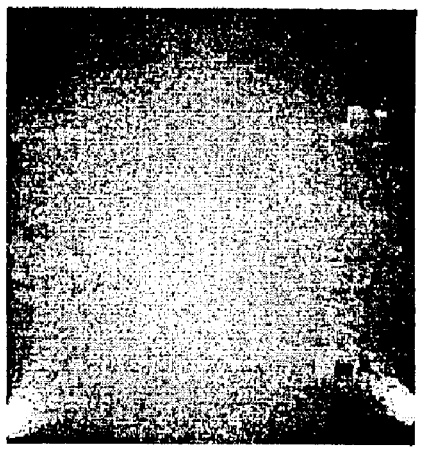
R=0.54km
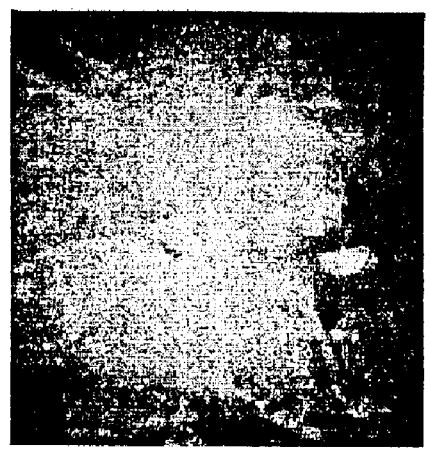
FIG. 7

METHOD AND SYSTEM FOR TARGET DETECTION USING AN INFRA-RED SENSOR

This application claims benefit of 60/369,282 filed Mar. 26, 2002.

TECHNICAL FIELD

The present invention relates generally to image processing. It particularly relates to an image processing target detection system and method that dynamically changes at least one system parameter to detect targets within various background temperature ranges.

BACKGROUND OF THE INVENTION

IR (Infrared) sensors are widely used in current missile targeting systems (e.g., self-targeting submissiles) to help detect and track target objects in a cluttered background. However, especially in poor weather conditions, the raw image (frame of pixels) data output from the IR sensor may frequently contain a significant portion of non-uniform/fixed pattern noise (FPN) in addition to permanent and blinking dead pixels. These dead pixels are either very bright or dark in intensity leading to non-linear (e.g., saturation or starvation) conditions for the targeting system resulting in low target detection reliability and lower sensor sensitivity. Therefore, many missile targeting systems include a NUC (non-uniform correction) system that attempts to replace the dead pixels and/or reduce the FPN for more reliable target detection (of target signature) and higher sensor sensitivity.

FIG. 1 illustrates an exemplary target detection system 100 found in the prior art that attempts to eliminate and/or reduce the noise and dead pixel problem. During operation, an IR sensor 102, preferably including an FPA (focal plane array), receives the radiant flux from the sensing area and outputs (generates) a raw image data signal 105 (e.g., target signature), at an output voltage ($V_p$), to amplifier 106 using a capacitor circuit 104. The amplifier 106 outputs a signal ($V_e$) 107 to an analog-to-digital converter 108 which outputs the digital (response) signal, $RIM_{ij}$ 208, to a NUC system 110. The NUC system then performs the process of noise reduction and removing/replacing dead pixel data to help achieve target detection and outputs digital signal $CIM_{ij}$ 112.

As shown in FIG. 1, the output image data signal from IR sensor 102 is given by equation 104a where the sensor integration time (IT), given by $I_p$ in the equation 104a, is a critical parameter for producing a high magnitude image signal as input to the amplifier 106. Switching to a longer sensor integration time helps to produce a higher magnitude signal input to the amplifier which aids noise reduction and increases sensor sensitivity leading to early target detection and reliable target tracking and recognition (identification). However, intelligent switching of the integration time must occur since a longer integration time may also lead to system (amplifier) saturation producing undesirable non-linear effects.

Many current targeting systems employ IT switching techniques that switch the integration time continuously on a frame-by-frame basis to maintain input pixel intensity at a middle intensity value to reduce starvation and saturation conditions for the system. However, such frequent IT switching varies the sensor sensitivity and requires more processing power. Additionally, such frequent IT switching to a significant plurality of different values increases calibration complexity for a targeting system when measuring important parameters of a target object (e.g., measured object irradiance needed for target discrimination and classification) since a different calibration is required for each operating IT. Additionally, raw pixel data output from the IR sensor resulting in system saturation should not necessitate a switch to a lower IT since a weak signature (e.g., low temperature) target object may be obscured by nearby bright intensity (e.g., burning) counter-measurement (CM) objects or decoys that produce the saturation condition. Under these conditions, a high or even higher (increased) sensor sensitivity should be maintained and thus the IT should not be switched to a lower value to eliminate the saturation condition.

Therefore, due to the disadvantages of current IT switching approaches, there is a need to provide a dynamic IT switching system that maintains (produces) a high sensor sensitivity without complicating important measurement calibrations and without lowering the reliability of detecting a target object obscured by uninterested objects that produce system saturation.

SUMMARY OF THE INVENTION

The method and system of the present invention overcome the previously mentioned problems by providing a target detection and tracking system capable of switching (changing) the integration time (IT) for the system IR sensor within a discrete set of values to maintain a high sensor sensitivity. The integration time is dynamically changed to the same or a different sensor integration time within the discrete set based on the image data output from the sensor satisfying pre-determined system parameter thresholds. Further features of the present invention include an IT-related saturation prediction function allowing the system to avoid unnecessary system saturation when determining whether an IT change should be made. Additional features of the present invention include a feedback function from the tracking portion of the system that allows target objects with a low sensor signature to be detected without being obscured by nearby uninterested objects that produce system saturation.

BRIEF DESCRIPTION OF THE DRAWINGS

FIG. 7 is an exemplary illustration of a burning counter-object co-located with actual targets in accordance with an embodiment of the present invention.

DETAILED DESCRIPTION

Figure 1:
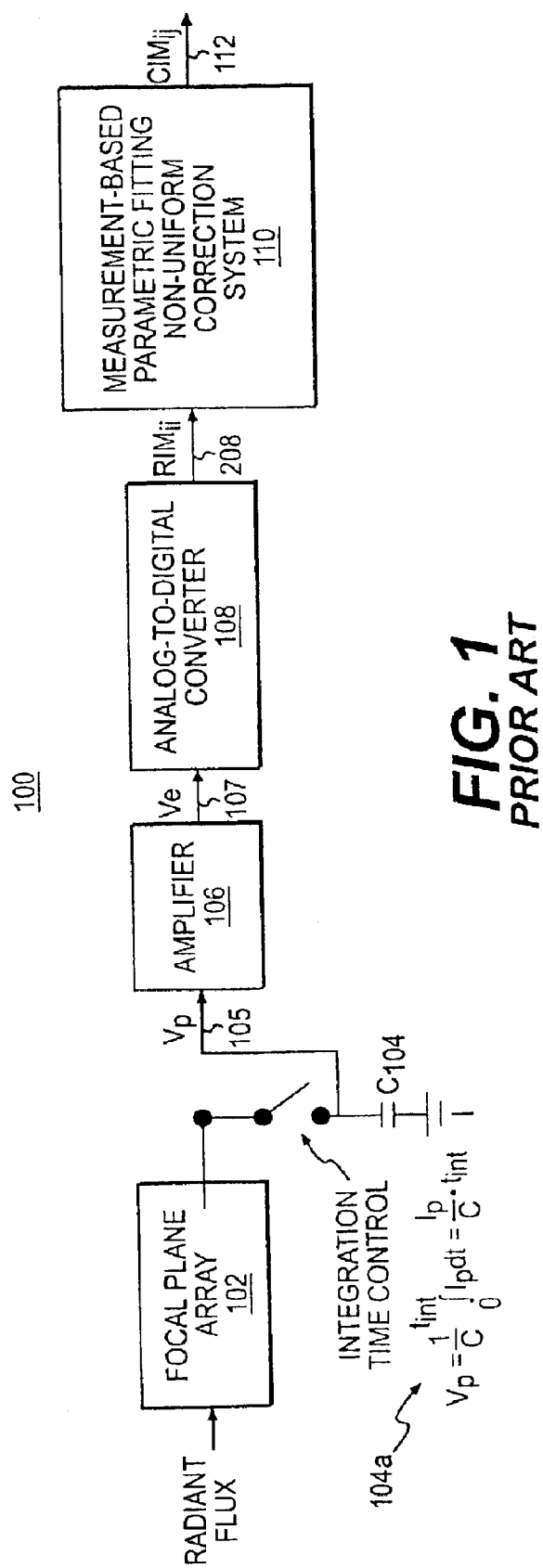
FIG. 1 is a block diagram of an exemplary target detection system found in the prior art.
Figure 2:
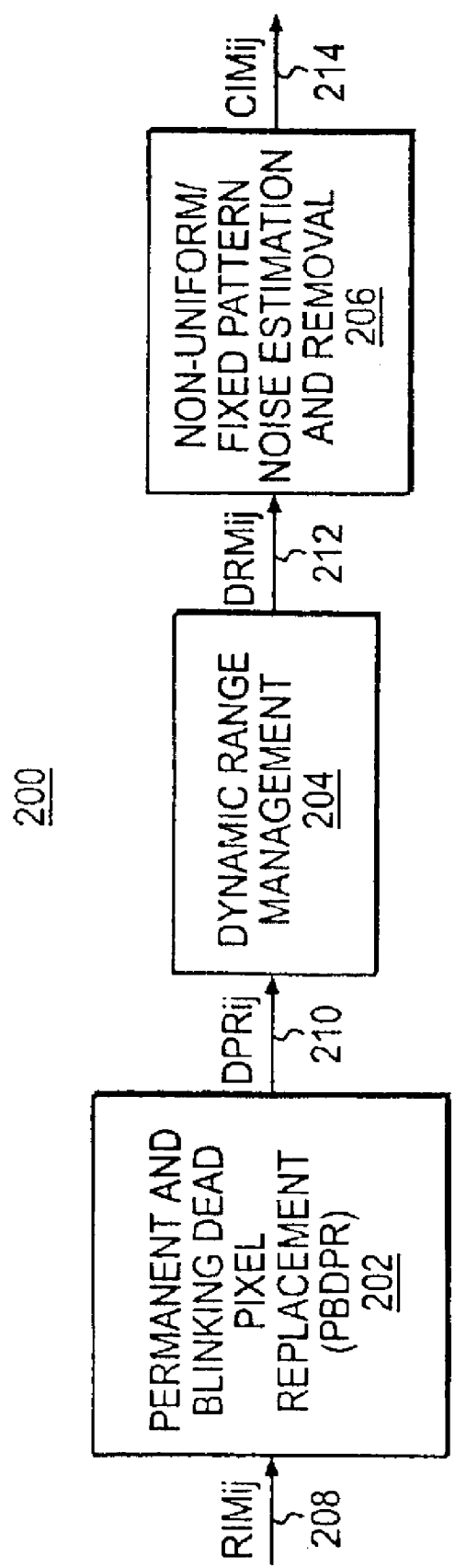
FIG. 2 is a functional block diagram of an exemplary non-uniform correction system in accordance with an embodiment of the present invention.

FIG. 2 shows a functional block diagram of an exemplary non-uniform correction (NUC) system 200 in accordance with an embodiment of the present invention. Advantageously, NUC system 200 may be incorporated into the target detection system 100 of FIG. 1, replacing the prior art NUC system 110, to receive the digital image signal (RIM$_{ij}$) 208, carrying the raw image data generated from sensor 102 (from the target signature) and output from A/D converter 108, and generate output data for reliable target detection by the system. The system 200 may include at least three functional components including a permanent and blinking dead pixel replacement (PBDPR) component 202, dynamic range management (DRM) component 204, and non-uniform/fixed pattern noise (FPN) Estimation and Removal (FPN E&R) component 206. Advantageously, NUC system 200 may be a CWF (chopper-wheel-free) and MBPF (Measurement-Based-Parametric-Fitting) NUC system to better discern background noise from raw image data output by sensor 102 and carried by digital image signal 208.

As described previously, the raw image data output by sensor 102 may include dead pixels (permanent and blinking) that are either very bright or dark in intensity leading to non-linear (e.g., saturation or starvation) conditions for the targeting system resulting in low target detection reliability and lower sensor sensitivity. To help reduce this problem, PBDPR functional component 202 may receive input signal RIM$_{ij}$ 208 and perform the function of replacing these dead pixels from input signal RIM$_{ij}$ 208 (raw image data) using well-known global and local thresholding techniques to generate output (response) signal DPR$_{ij}$.

As described in greater detail later, DRM functional component 204 may receive input signal DPR$_{ij}$ 210 to initiate the function of dynamically changing (switching) the integration time (and electronic gain of amplifier 106) within a predetermined, discrete set of values to maintain sufficient sensor sensitivity (producing reliable target detection) within a linear dynamic temperature range (for the sensor 102) divided into a multiple number of predetermined operating temperature ranges that generate raw image data, RIM$_{ij}$ 208. As a result of this process, DRM component 204 generates output signal DRM$_{ij}$ 212 (equal to input signal DPR$_{ij}$ 210).

FPN E&R functional component 206 may receive input signal DRM$_{ij}$ 212, and perform the function of estimating and removing the non-uniformity/fixed pattern noise (FPN) from input signal DRM$_{ij}$ 212. The estimation and removal may advantageously be based on lab measurements to determine the particular parameter settings for greater noise estimation and removal. Piece-wise (e.g., two pieces) or one-piece linear curve fittings may be used for different predetermined temperature ranges to estimate the FPN at different temperatures and ITs. As a result of this process, DRM component 204 generates output signal CIM$_{ij}$ 214.

Figure 3:
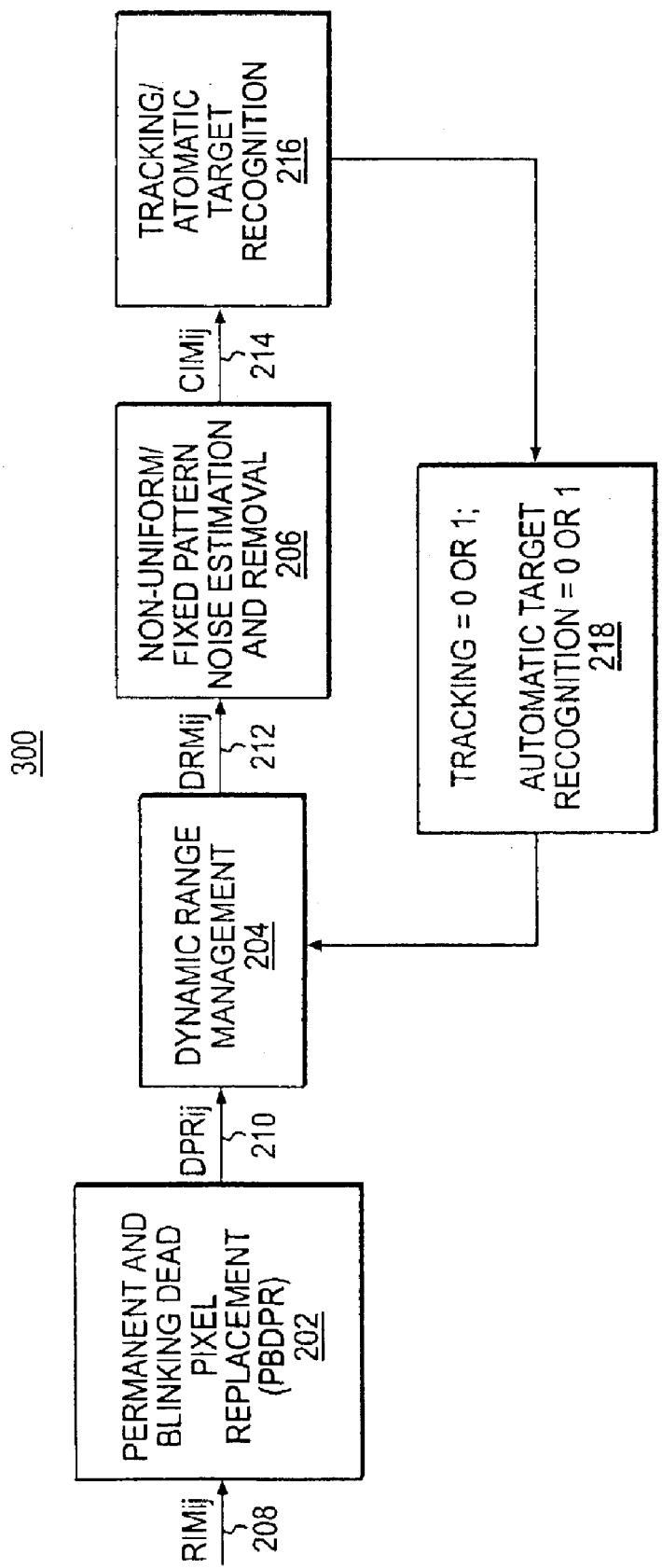
FIG. 3 is a block diagram of exemplary non-uniform correction system with tracking feedback in accordance with an embodiment of the present invention.

As shown in FIG. 3, the NUC system 200 of FIG. 2 may additionally include at least one advanced logic functional component, a tracking/automatic target recognition (ATR) component 216. Tracking/ATR component 216 may receive input signal CIM$_{ij}$ 214 and perform the function of tracking and automatically recognizing the detected target. As a result of this process, Tracking/ATR component 216 may generate one or more output (feedback) signals 218 including signals indicating whether reliable tracking and/or ATR has been acquired or not. Advantageously, digital signals of value 1 or 0 may be used to indicate acquisition (e.g., Tracking=1, ATR=1) or no acquisition (e.g., Tracking=0, ATR=0) of tracking and/or ATR. Output signals 218 are fed back into DRM component 204 to change NUC system 200 from a feedforward system to a feedback target detection system that uses the feedback of tracking/ATR signals (carried by output signal 218) to determine whether an IT switch should occur.

Advantageously, DRM component 204 may function as a subsystem within NUC system 200 to adaptively (dynamically) adjust the integration time (IT) of the sensor (FPA) to meet predetermined requirements (thresholds) for sensor sensitivity and dynamic temperature range (operating temperature) of the sensor. Additionally, DRM component 204 may function to reduce the IT of the sensor in response to pixel saturation. Advantageously, DRM component 204 may be embodied as logic device using dynamic random access memory (DRAM).

During operation, DRM component 204 may use an algorithm (DRM algorithm) to switch the sensor IT for efficiently detecting a plurality of targets even when the targets may be located among high intensity countermeasurement objects (decoys) that create a system saturation condition. Execution (operation) of the algorithm may be predicated on the pre-selection of at least four integration times corresponding to four temperature ranges of interest to detect targets.

Advantageously, the integration times are pre-selected (predetermined) to maintain high sensor sensitivity requirements for each temperature range. For target temperatures greater (>) than 70 degrees Celsius (° C.) (saturated target intensities) and background temperature range of −10~>70° C., an IT approximately equal to 2.5 milliseconds (ms) may be selected for the sensor. A shorter IT is needed for this higher temperature range for the target to avoid system saturation. Advantageously, for lower target temperatures (<70° C.) a plurality of other integration times may be selected to maintain high sensor sensitivity. For a background temperature range of 35~70° C., an IT approximately equal to 5.2 milliseconds (ms) may be selected for the sensor. Alternatively, for a background temperature range of 0~35° C., an IT approximately equal to 9 milliseconds (ms) may be selected for the sensor. Further alternatively, for lower target temperatures (<70° C.) and a background temperature range of −33~0° C., an IT approximately equal to 16.6 milliseconds (ms) may be selected for the sensor. Advantageously, the maximum amount of time for switching from the lower temperature range IT to the highest temperature DR (e.g., 16.6 to 2.5 ms) by the DRM algorithm may be a sampling duration of three frames.

Advantageously, sensor 102 may be embodied as a Cincinnati Electronics Indium/Antimony (CE-InSb) focal plane array where the sensor maintains high sensitivity for the different IT's pre-selected and corresponding to the different background temperature ranges. It is noted that the selection of a CE-InSb sensor (FPA) and the associated IT's (based on the related background temperature ranges) are solely exemplary and should not be viewed as a limitation upon the present invention. As such, alternative manufacturers and models of FPAs (sensors), along with alternative integration times, may be selected and still be within the scope of the present invention.

Figure 4:
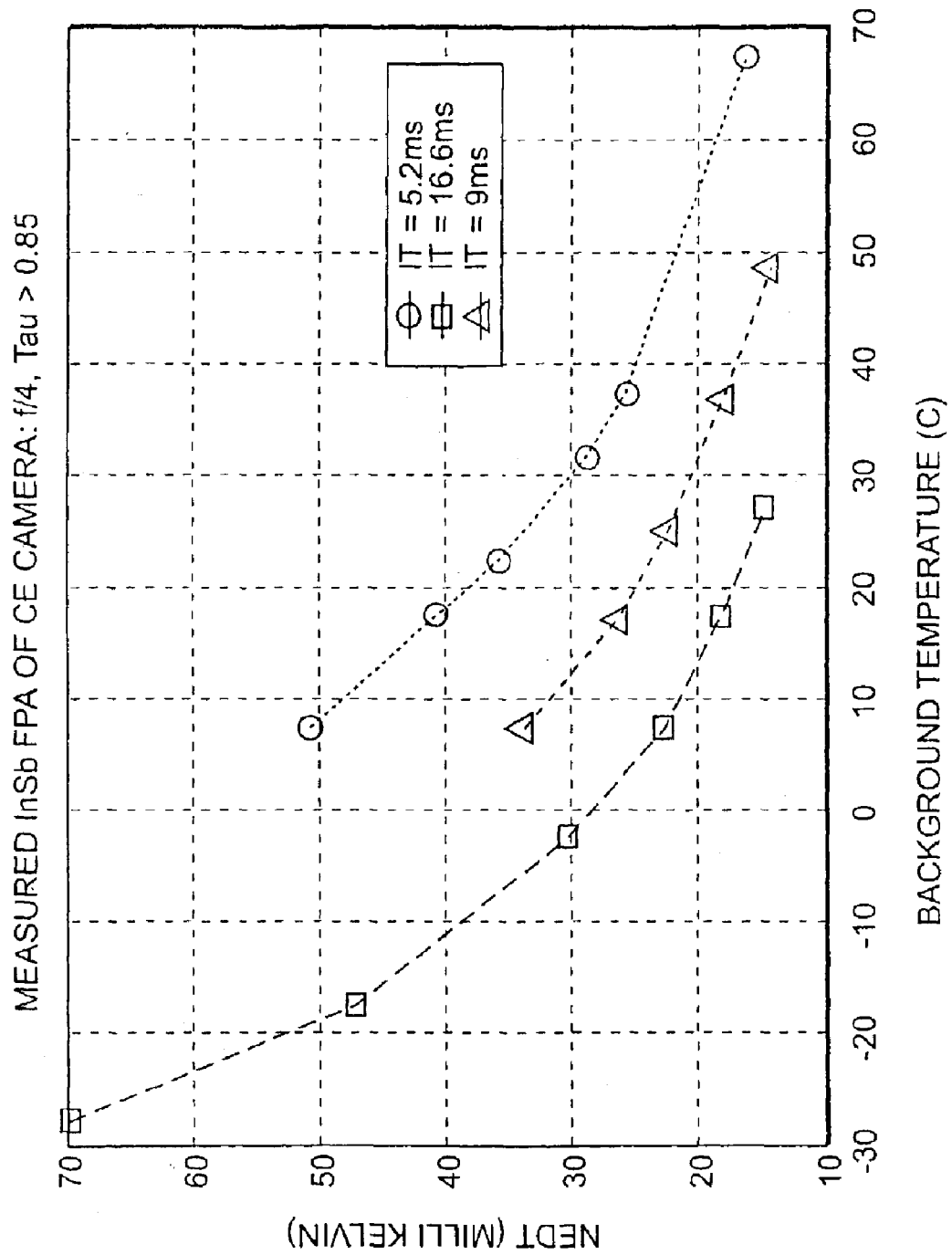
FIG. 4 shows a graph with exemplary sensor sensitivity curves in relation to sensor background temperature ranges in accordance with an embodiment of the present invention.

As shown in FIG. 4, for CE-InSb sensors, sensitivity at particular background temperature ranges is related (inversely proportional) to the NEDT (noise equivalent delta temperature) for the sensor. These sensor sensitivity characteristics allow a low temperature target to be detected with a lower NEDT (due to increased sensitivity at lower NEDTs). The NEDT may be calculated from the CE camera measurement data (e.g., F, F/4, and Tau) to produce the sensitivity curves as shown in FIG. 4, where F is the lens F-number, F/4 is the number for the CE camera, and Tau is the optical transmittance. As shown in FIG. 4, at lower background temperature ranges (e.g., −30° C.), a higher NEDT is produced which inversely decreases the sensor sensitivity necessitating the use of a longer IT (e.g., 16.6 ms) to maintain efficient target detection by the target detection system 200. Alternatively, for higher background temperature ranges (e.g., 60~70° C.), a lower NEDT is produced which inversely increases the sensor sensitivity and necessitates the use of a shorter IT (e.g., 5.2 ms) to avoid system saturation from the higher background temperature and maintain target detection by system 200.

Advantageously, a plurality of predetermined system requirements may be established for the sensor relating to particular, calculated NEDT values and corresponding background temperature ranges to maintain high sensor sensitivity for accurate target detection. For example, it may be required that the maximum background temperature (for the sensor) approximately equals 63° C. From FIG. 4 (produced from lab measurements and sensor data), it can be verified that for an IT approximately equal to 5.2 ms, the background temperature range for the sensor is 0° C.~70° C. ensuring that the maximum background temperature requirement may be satisfied for all IT$\leq$5.2 ms.

Figure 5:
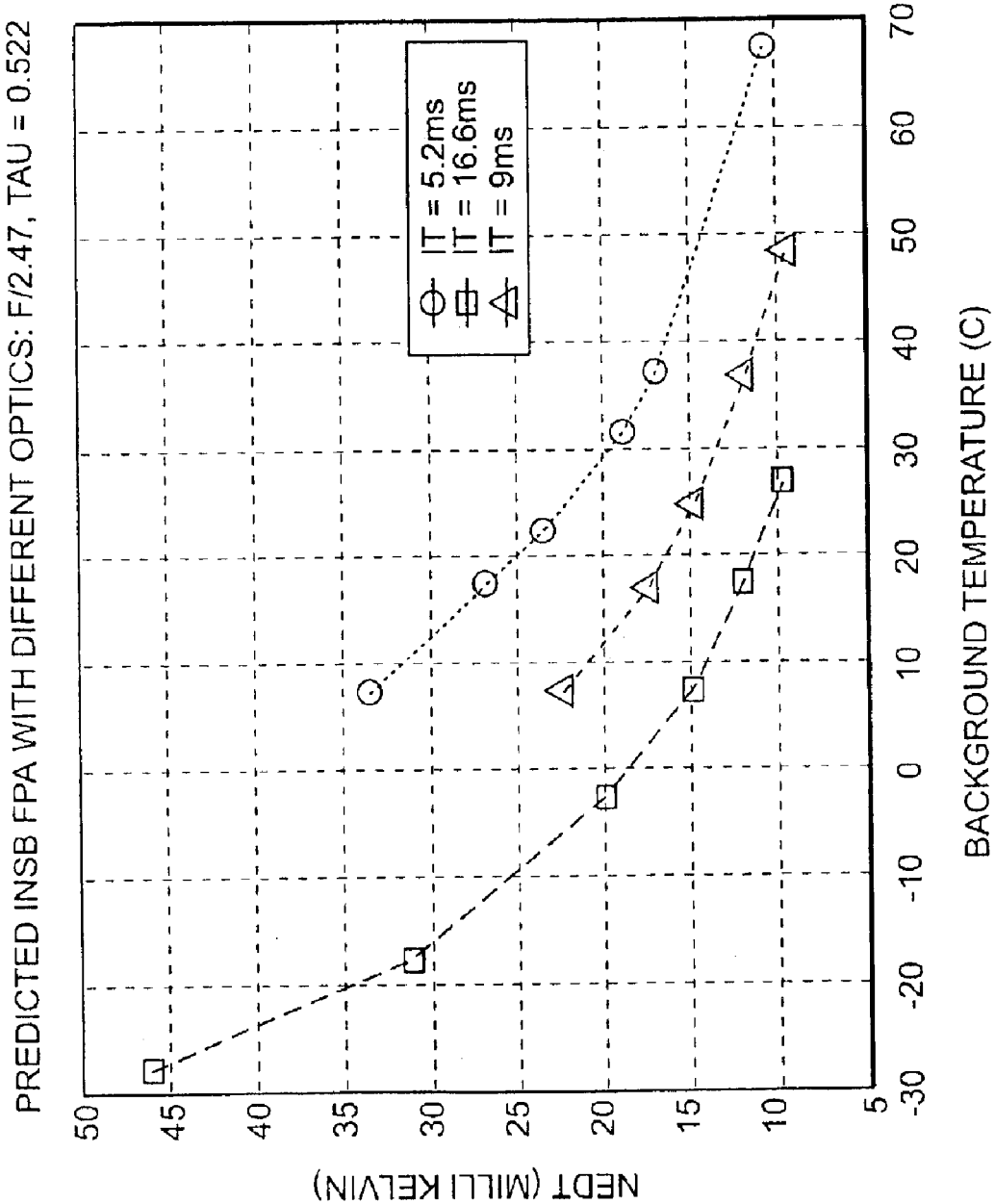
FIG. 5 shows a graph with exemplary predicted sensor sensitivity curves as a function of temperature in accordance with an embodiment of the present invention.

A second system requirement to be satisfied for greater sensitivity may be to maintain NEDT$\leq$50 mk at 22° C. for all ITs$\leq$5.2 ms. From FIG. 4, for an IT approximately equal to 5.2 ms, NEDT (from lab measurements) may be calculated to be 35.5 mk (mili Kelvin) at 22.5° C., where F=4 and Tau=0.88. As shown in FIG. 5, sensor sensitivity at this background temperature range (22.5° C.) may be increased based on changing the optical settings for the sensor. For example, changing Tau to 0.522 and F to 2.47 reduces the NEDT to approximately 22.8 mk at 22.5° C. These calculations verify that this second system requirement (NEDT$\leq$50 mk at 22° C.) may be satisfied for all IT$\geq$5.2 ms.

A third system requirement may be to maintain a minimum background temperature (for the sensor) of −33° C. As shown in FIGS. 4–5, for these sensors the NEDT increases significantly at very low (background) temperatures (e.g., −30° C.) producing the inverse result of low FPA (sensor) sensitivity at low temperatures. As shown in FIG. 5, NEDT is approximately equal to 46 mk at −28° C. (where F=2.47 and Tau=0.522) which ensures that this third system requirement (minimum background temperature of −33° C.) may be satisfied all ITs$\geq$16.6 ms.

Advantageously, the background temperature (relating to the operation temperature of sensor 102) used in the DRM 204 algorithm may relate to the specific image mean (averaged) value for images received and output by sensor 102. The specific image mean may be measured and defined as a mean image count (MIC) relating to the pixel intensity for the received raw image data. During execution of the algorithm, the MIC count (value may be given in COUNT units) for images received by sensor 102 may be used to determine the current background temperature range and the corresponding, currently selected IT. For example, MIC__0__16 and MIC__0__9 may be refer to the mean image count values for background temperature ranges of 0° C. (for each MIC values) with corresponding ITs (approximately) equal to 16.6 and 9 ms, respectively. The MIC count may be calculated from the center 64×64 elements of the FPA.

A key feature of the DRM algorithm for switching integration times (example shown in the Appendix) performed by DRM component 204 is the ability to distinguish between saturated pixels caused by high temperature targets (or objects). Advantageously, the DRM algorithm may use a "SAT" variable to indicate when system saturation has occurred or not (SAT=1 for saturation, or SAT=0 for no saturation). For example, the algorithm may be designed to produce SAT=1 if there are M pixels with Tao values of larger than 4050 (maximum Tao=4096), or otherwise SAT=0. M may be a selectable parameter (e.g., 2~3% of the center 64×64 pixels), and saturation pixels may be estimated by a fast histogram method (example using MATLAB code shown in the Appendix) using a logic device such as a field programmable gate array (FPGA). For a tracking mode of the algorithm (determining whether tracking has been acquired or not), the DRM component 202 may use the center 64×64 pixels to compute the histogram. Alternatively for the ATR mode (determining whether ATR has been acquired or not), the DRM component 202 may use the whole 256×256 pixels (elements) from the image signal (RIM$_{ij}$ 208) generated from sensor 102. Also, to reduce the computational intensity for the ATR mode, under-sampling of the 256×256 image may be performed using every 4$^{th}$ or 8$^{th}$ pixel.

Under some situations the saturated pixels may be from some uninterested objects or clutters (decoys) and the signatures of a target may still be very weak. Advantageously, under these situations, the DRM component 204 may maintain a high sensitivity mode (not switch to a shorter IT) using a feedback feature (from output signals 218 from Tracking/ATR component 216) of the algorithm.

Additionally, when SAT=0, performance of the DRM algorithm (by DRM component 204) includes using a saturation-integration-time-prediction (SRITP) function (example using MATLAB shown in the Appendix) to determine whether a switch to a longer IT may be performed to increase sensor sensitivity without causing system saturation. The SRITP function may predict the particular integration time (IT) that increases the system gain to produce SAT=1 (if M pixels with Tao values larger than Tao=4050). After the predicted IT is produced by the SRITP function, DRM component 204 may compare the predicted IT with the actual IT to be switched to and decide to do either of the following: 1) if the predicted IT (causing system saturation) equals the IT to be switched to, then do not switch to a longer IT and maintain the current IT, or 2) if the predicted IT does not equal (e.g., greater than) the IT to be switched to, then switch to the longer IT to increase sensor sensitivity. The use of the SRITP functions allows the DRM to work under a more steady state operation without frequent switching of the sensor IT.

Figure 6:
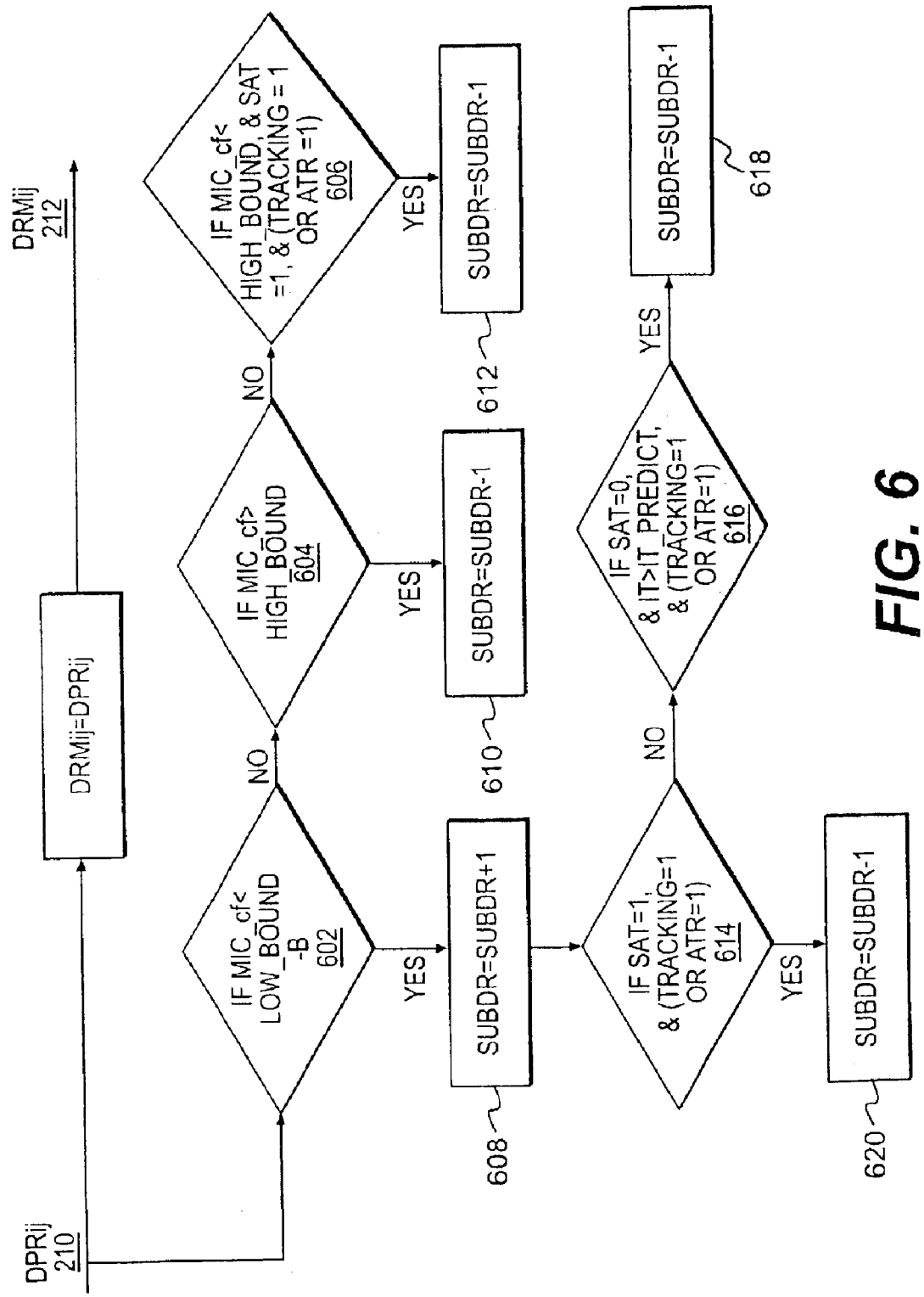
FIG. 6 is a flowchart of an exemplary integration time switching algorithm in accordance with an embodiment of the present invention.

FIG. 6 is a flowchart illustration of the DRM algorithm shown in Appendix A wherein signal DPR$_{ij}$ 210 (output signal produced by PBDPR component 202) is received by DRM component 204 to initiate performance of the DRM algorithm which may produce output (response) signal DRM$_{ij}$ 212. Advantageously, as shown by expression 605, response signal DRM$_{ij}$ 212 is equal to input signal DPR$_{ij}$ 210 as performance of the DRM algorithm does not change the value of input signal 210, but uses this input to control the sensitivity of sensor 102 by dynamically switching sensor integration time (in response to predetermined criteria) for future image time frames. Advantageously, B is an adjustable buffering integer number (e.g., set at 100) that may be used to prevent integration times from switching back and forth when the background temperature may be close to the two IT-switching temperatures (e.g., 0° C. and 35° C.). Also, when the DRM algorithm is initially performed, the actual targets may be a far distance away from the sensor 102 which makes it advantageous to initiate the DRM algorithm, for a predetermined number of frames (e.g., 5 frames), by selecting an IT corresponding to the middle background temperature range (e.g., 9 ms for 0~35°

C.) for the sensor (from sensor data generated from lab measurements). This preselected IT/temperature range corresponds to mean image counts MIC_0_9 (defined by low_bound) and MIC_35_9 (defined by high_bound) which sets the initial IT (for the DRM algorithm) to 9 ms for the corresponding background temperature range of 0~35° C.

As a preliminary step to performance of the DRM algorithm (before actual image sensing by sensor 102) when saturation has not occurred (e.g., SAT=0), the SRITP function is performed to predict the sensor IT that will produce system saturation. At step 602, image sensing begins and the mean image count (MIC) is measured for the image signal (DPR$_{ij}$) 210 input to DRM component 204 and compared with the lower-end MIC value (low_bound) for IT=9 ms. Advantageously, the mean image count value is measured for a predetermined number of image frames (e.g., for n frames) to obtain the best possible MIC value. If the measured MIC (MIC_cf) is less than the lower-end MIC value (e.g., for IT=9 ms at 0° C.), then the algorithm proceeds to step 608 where the current IT value is upwardly switched (incremented) to the next higher value for the corresponding lower background temperature range (e.g., switched to IT=16.6 ms for −33~0° C.), and the algorithm proceeds to step 614. Otherwise, if MIC_cf is not less than low_bound, then the algorithm proceeds to step 604. At step 604, MIC_cf is compared with high_bound (high end MIC value for IT=9 ms). If MIC_cf is greater than high_bound, then the algorithm proceeds to step 610 where the current IT value is downwardly switched (decremented) to the next lower value for the corresponding higher background temperature range (e.g., switched to IT=5.2 ms for 35~70° C.). Otherwise, if MIC_cf is not greater than high_bound, then the algorithm proceeds to step 606.

Advantageously, steps 602, 604, 608, and 610 may constitute the feed-forward portion (using basic logic functions) of the target detection system 200 that uses the measurements of the input image data to efficiently switch the current sensor IT to maintain reliable target detection. The other steps (606, 612, 614, 616, 618, 620) of the DRM algorithm shown in FIG. 6 may constitute the feedback portion (using advanced logic functions) of target detection system 200 which use the results from the tracking/ATR component 216 (e.g., output signals 218 indicating tracking=0 or 1, ATR=0 or 1) to determine whether to increment, decrement, or maintain the current sensor IT value to maintain high sensor sensitivity leading to reliable target detection (of target signature) within the dynamic temperature range of the sensor.

At step 606, if MIC_cf is not greater than high_bound, SAT=1, and either Tracking=1 or ATR=1, then the algorithm proceeds to step 612 where the current IT value is downwardly switched (decremented) to the next lower value for the corresponding higher background temperature range (e.g., switched to IT=5.2 ms for 35~70° C.). For this portion of the algorithm, since tracking and/or ATR has been acquired, the algorithm switches to a shorter IT to eliminate the system saturation condition.

Alternatively at step 606, if SAT=1, but tracking and ATR=0, then most likely the system saturation (saturated pixels) is being caused by uninterested objects (e.g., burning counter-measurement objects, burning decoys, clutter) and therefore the DRM algorithm will maintain the current, longer, and higher-sensitivity IT to try and detect the weak target among the bright intensity background clutter.

At step 614, if system saturation exists (SAT=1) and tracking or ATR has been acquired (tracking=1 or ATR=1), then the algorithm proceeds to step 620 where the current IT value is downwardly switched (decremented) to the next lower value for the corresponding higher background temperature range. For this portion of the algorithm, since the original sensor IT was previously incremented at step 608, the original IT is effectively re-established (maintained) by now reversing the previous increase (by decrementing in step 620). Since tracking=1 and/or ATR=1, the algorithm wants to maintain the current tracking and/or ATR acquisition of the target despite the current system saturation condition. Otherwise, if system saturation does not exist (SAT=0), then the algorithm proceeds to step 616.

Alternatively at step 614, if SAT=1, but tracking and ATR=0, then most likely the system saturation (saturated pixels) is being caused by uninterested objects (e.g., burning counter-measurement objects, burning decoys, or clutters) and therefore the DRM algorithm will switch to the longer, higher-sensitivity IT to try and detect the weak target among the bright intensity background clutter.

FIG. 7 is an exemplary illustration, at various ranges to the target, of the alternative scenarios described in relation to steps 606, 614 where two burning decoys (barrels) 702, 704 may attempt to obscure detection of the actual target (tank) 706 co-located (in between) with the decoys.

At step 616, if SAT=0 and the IT to be switched to is greater than the predicted IT to produce system saturation (from SRITP function), then the algorithm proceeds to step 618 where the current IT value is downwardly switched (decremented) to the next lower value for the corresponding higher background temperature range. For this portion of the algorithm, it is determined that switching to the next higher IT will result in system saturation. Therefore, the algorithm decides to reverse the previous IT increment (at step 608) and maintain the original IT value (e.g., IT=9 ms) to prevent system saturation with a switch. This decision to stay at the original IT value helps to keep the system 200 in a steady state operation without constant fluctuation of the IT value. Advantageously, the steps of the DRM algorithm are repeated indefinitely until an actual target hit occurs (or alternatively the target detection system 200 is rendered inoperative).

Figure 8:
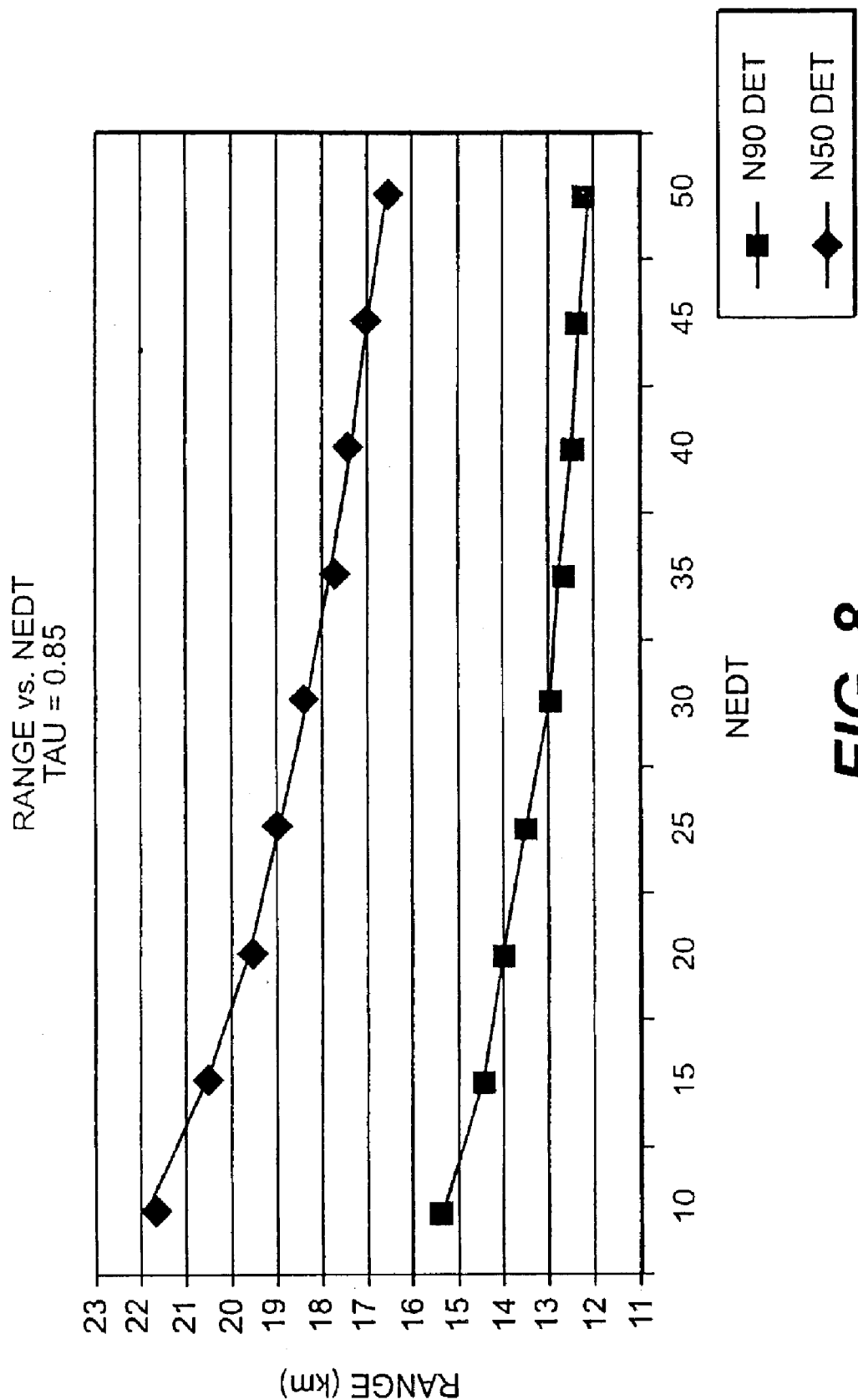
FIGS. 8–12 show graphs with exemplary performance sensor sensitivity curves in accordance with an embodiment of the present invention.
Figure 9:
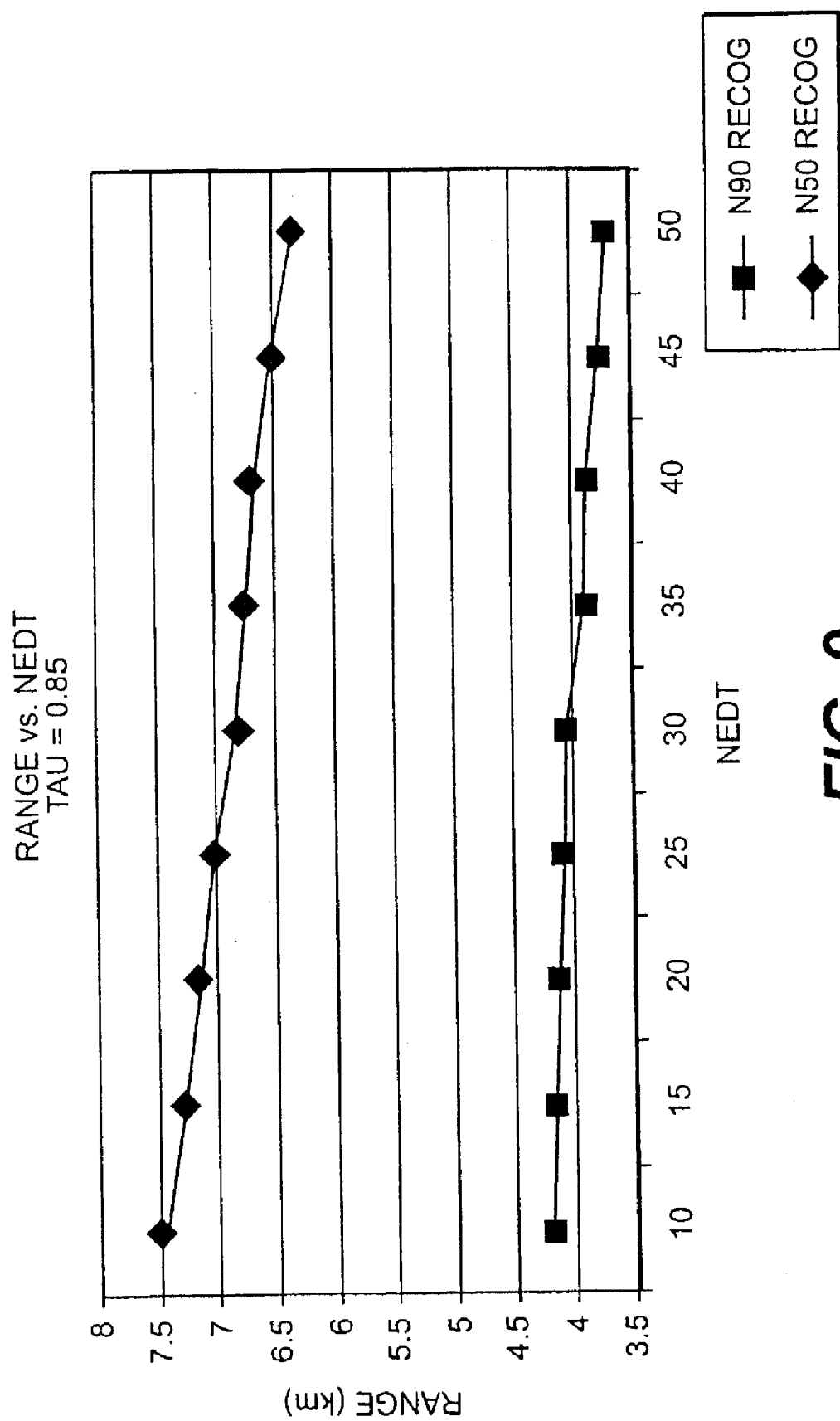
Figure 10:
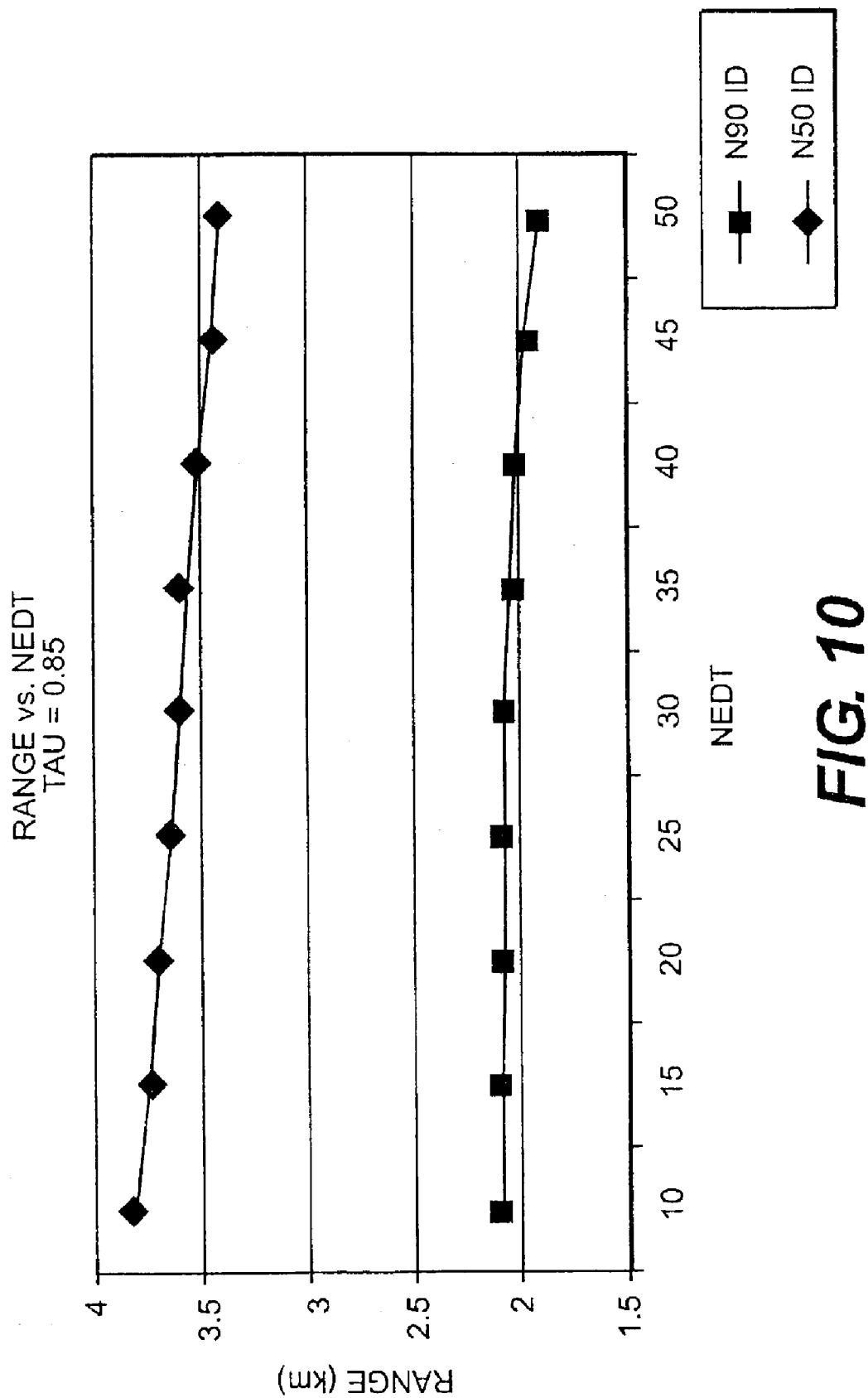
Figure 11:
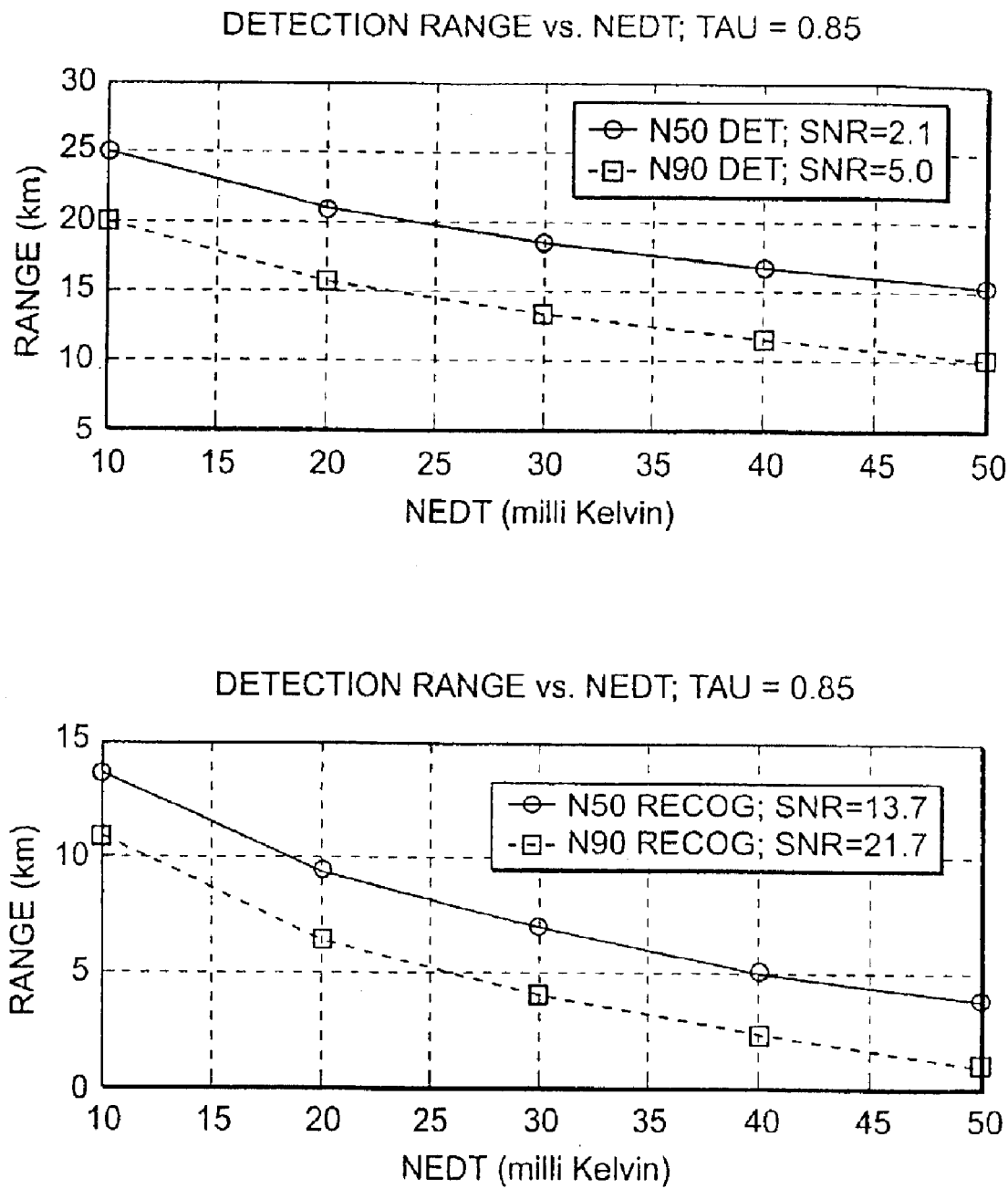
Figure 12:
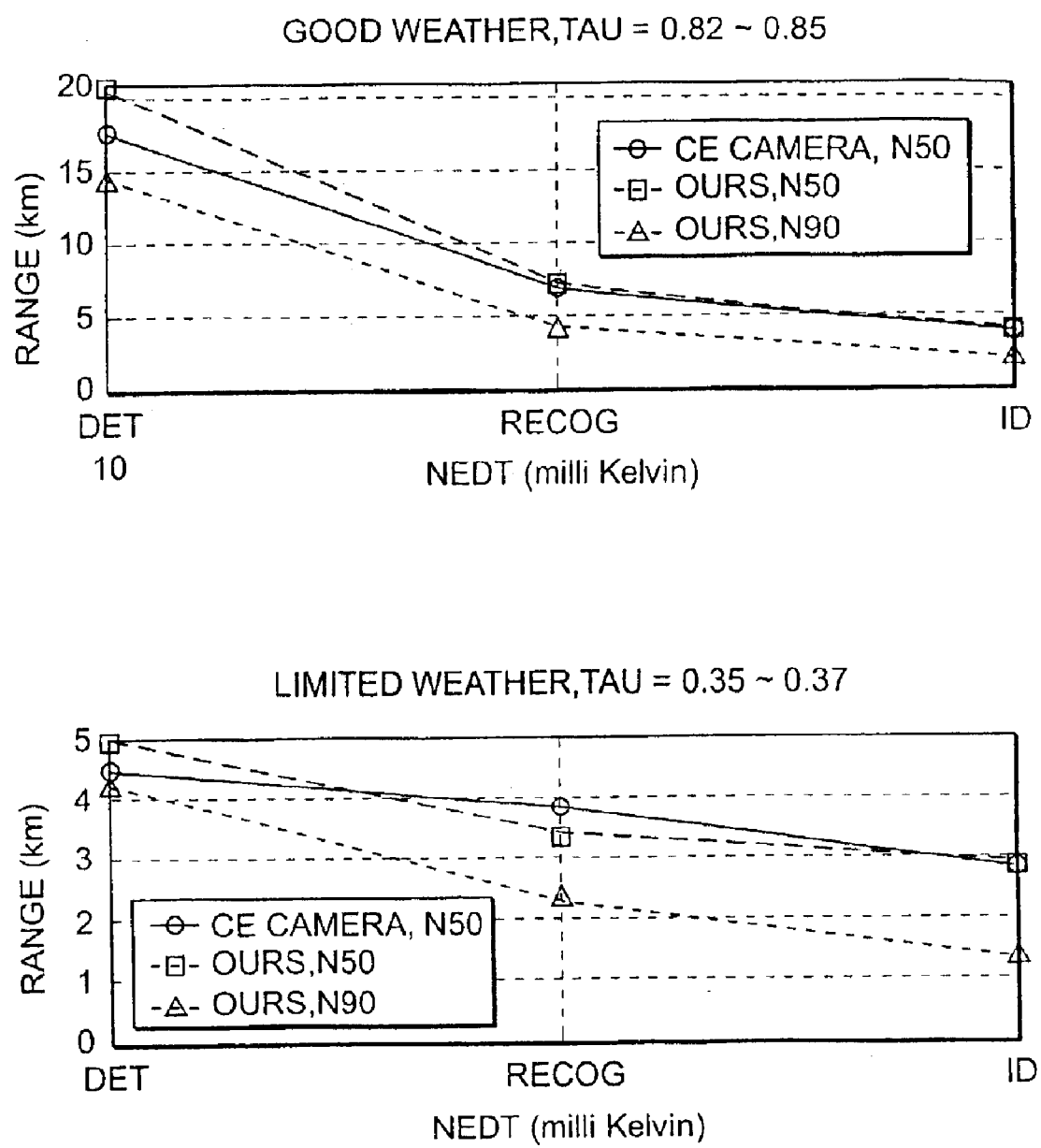

FIGS. 8–12 illustrate various performance results (sensitivity curves and recognition/detection vs. range curves) using the DRM algorithm described herein in accordance with embodiments of the present invention. N50 and N90 represent 50% probability target detection and 90% probability target detection, respectively. CE N50 represents the 50% probability target detection as given by CE standards for the sensor (camera). Advantageously, during operation for a low background temperature example (e.g., −33~0° C.) as shown in FIGS. 8–10, the DRM algorithm may switch from an (initially set) IT=9 ms to IT=16.6 ms after the fifth frame (e.g., SAT=0 and switched to IT≦IT_predict, and tracking=1 and/or ATR=1, from step 616) and stay there until an actual target hit occurs. Alternatively, during operation for a mid-background temperature example (e.g., 0~35° C.) as shown in FIG. 12, the DRM algorithm may continually stay at an (initially set) IT=9 ms after the fifth frame (e.g., SAT=0 and switched to IT>IT_predict, and tracking=1 and/or ATR=1, from step 616) and stay there until an actual target hit occurs.

Also, alternatively, during operation for a target pixel-saturation example (e.g., background temperature range of −33~0° C. and target temperature=65° C.) as shown in FIG. 11, the DRM algorithm may switch from an (initially set) IT=9 ms to IT=16.6 ms after the fifth frame (e.g., SAT=0, and tracking=1 and/or ATR=1, from step 616), then switch back to IT=9 ms a few frames later (e.g., SAT=1, and tracking=1 and/or ATR=1, from step 606), and then switch to IT=5.2 ms (e.g., SAT=1 and tracking=1 and/or ATR=1, from step 606) and stay there until an actual target hit occurs.

Further alternatively, during operation for a burning counter-measurement example (for various ranges—R) as shown in FIG. 7 (e.g., burning decoys at 100° C. causing SAT=1 although background temperature range of 0~35° C. and target temperature=25° C.), the DRM algorithm may select an (initially set) IT=9 ms (with high sensitivity) after the fifth frame (e.g., SAT=1, but tracking=0 and/or ATR=0, from step 606) and then maintain IT=9 ms (e.g., SAT=1, and tracking=0 and/or ATR=0, from step 606) and stay there until an actual target hit occurs.

A NUC system using the DRM algorithm described herein, in accordance with embodiments of the present invention, provides a number of advantages. These advantages include the division of the required dynamic temperature range (e.g., −33~63° C.) of the system sensor into three sub-dynamic ranges corresponding to three pre-selected (predetermined) sensor IT's (e.g. 5.2, 9, 16.6 ms) which helps the NUC system maintain requirements for operation temperature dynamic range and sensor (system) sensitivity. Additionally, a NUC system using the DRM algorithm may also select an IT (e.g., 2.5 ms) to avoid pixel saturation for a very hot target (or a close target). And with additional information from conditions such as saturation, tracking, and ATR, the NUC system can adaptively (dynamically) select the appropriate IT's to maintain target intensity within a given linear dynamic range (even for a hot target).

Although the invention is primarily described herein using particular embodiments, it will be appreciated by those skilled in the art that modifications and changes may be made without departing from the spirit and scope of the present invention. As such, the method disclosed herein is not limited to what has been particularly shown and described herein, but rather the scope of the present invention is defined only by the appended claims.

APPENDIX A

DRM Algorithm

```
IT_number(1:4) = [2.5, 5.2, 9, 16.6];
% Initialization,
SubDR = 3; % 1 for IT=2.5 ms, 2 for IT=5.2 ms, 3 for IT=9 ms, 4 for IT=16.6 ms
For 1 ≦ frame_number = 5
    Set IT = 9 ms & GAIN_SEL = 0; % 1 for high gain and 0 for low gain
    Low_bound = MIC_0_9;
    high_bound = MIC_35_9;
END
% Start the 6th frame,
For 5 < frame_number < n,
    If SAT = 0,
        IT_predict = SRITP(CurrentFrame, IT_number(SubDR), M);
    End
    If MIC_cf < low_bound - B, and SubDR ≠ 4, % MIC_cf is the current frame MIC
        SubDR = SubDR + 1;
        If SAT = 1, and (Tracking = 1 or ATR = 1).
            SubDR = SubDR - 1;
        Else If SAT = 0, and IT_number(SubDR) > IT_predict, and (Tracking = 1 or ATR = 1),
            SubDR = SubDR - 1;
        End
    Esle If MIC_cf > high_bound, and SubDR ≠ 1,
        SubDR = SubDR - 1;
    Else If MIC_cf < high_bound, and SAT = 1, and (Tracking = 1 or ATR = 1), and SubDR ≠ 1,
        SubDR = SubDR -1;
    End
If SubDR = 4, set IT=16 ms, high_bound = MIC_0_16; end
    If SubDR = 3, set IT=9 ms, low_bound = MIC_0_9; high_bound = MIC_35_9; end
    If SubDR = 2, set IT=5.2 ms, low_bound = MIC_35_5; high_bound = MIC_70_5; end
    If SubDR = 2, set IT=2.5 ms, low_bound = MIC_70_7; end
End
```

SRITP and Histogram of center 64 × 64 pixels

```
function [IT_predict, Hist] = SRITP(CurrentFrame, IT_current, M)
% This is a saturation-related-integration-time-prediction (SRITP)
% function. Also include the function calculating the histogram
% of the center 64 × 64 pixels.
% Input parameters are as follows:
% CurrentFrame = the current 256 × 256 image frame
% IT_current =    the number representing the integration time for
%                 the current image collected
% M =             the number of pixels (in central 64 × 64) allowed to
%                 saturate
%****************************************
% calculate the histogram of center 64 × 64: Hist
%****************************************
cmax = fix(max(max(CurrentFrame(96:160,96:160))));
cmin = fix(min(min(CurrentFrame(96:160,96:160))));
cdelt = fix(cmax - cmin);
c_hist = hist(CurrentFrame(96:160,96:160),cdelt);
chist_sum = sum(c_hist,2);
```

APPENDIX A-continued

```
Hist = zeros(4096,1);
for j = 1:cdelt
    Hist(j+min) = chist_sum(j);
end
%************************************************
% Predict the saturation related integration time: IT_predict
%************************************************
j = fix(max(max(CurrentFrame)));
hist_sat = 0;
while j > 0
    if hist_sat < M
        hist_sat = hist_sat + Hist(j);
        j = j-1;
    else
        sat_val = j;
        j = -1000;
    end % if
end % while
It_predict = 4050 / sat_val * IT_current;
```

What is claimed is:

1. A method for dynamically changing a target detection system parameter, comprising:
receiving image data, output from a sensor in a receiving system and generated using one of a discrete set of sensor integration times wherein each integration time being associated with a corresponding temperature range;
determining whether said image data satisfies at least one predetermined threshold; and
selecting the same one or a different sensor integration time for a succeeding frame of image data to produce a predetermined sensor sensitivity based on said image data satisfying said at least one predetermined threshold.

2. The method of claim 1, wherein said selecting includes selecting the same one or a different sensor integration time based on said image data not producing saturation in the system.

3. The method of claim 2, wherein said selecting includes selecting the same one sensor integration time based on predicting saturation being produced in the receiving system from the succeeding frame of said image data.

4. The method of claim 2, wherein said selecting includes selecting a different sensor integration time based on predicting saturation not being produced in the receiving system from a succeeding frame of said image data.

5. The method of claim 1, wherein said selecting includes selecting the same one sensor integration time based on said image data producing saturation and target tracking in the system.

6. The method of claim 1, wherein said selecting includes selecting the same one sensor integration time based on said image data including non-target data producing saturation and no target tracking in the system.

7. The method of claim 1, wherein said selecting includes selecting a different sensor integration time based on said image data including non-target data producing saturation and no target tracking in the system.

8. The method of claim 1, wherein said receiving includes receiving image data, output from a sensor in a receiving system and generated using one of a discrete set of less than five sensor integration times wherein each integration time being associated with a corresponding temperature range.

9. The method of claim 1, wherein said selecting includes selecting the same one or a different sensor integration time to produce a pre-determined sensor sensitivity and sensor target detection range based on said image data satisfying said at least one pre-determined threshold.

10. A system for dynamically changing a target detection system parameter, comprising:
a sensor for receiving image data in a receiving system and outputting image data using one of a discrete set of sensor integration times wherein each integration time being associated with a corresponding temperature range; and
a controller, interconnected to said sensor, for determining whether said image data satisfies at least one predetermined threshold and selecting the same one or a different sensor integration time for a succeeding frame of image data to produce a predetermined sensor sensitivity based on said image data satisfying said at least one predetermined threshold.

11. The system of claim 10, wherein said controller to select the same one or a different sensor integration time based on said image data not producing saturation in the system.

12. The system of claim 11, wherein said controller to select the same one sensor integration time based on predicting saturation being produced in the receiving system from a succeeding frame of said image data.

13. The system of claim 11, wherein said controller to select a different sensor integration time based on predicting saturation not being produced in the receiving system from a succeeding frame of said image data.

14. The system of claim 10, wherein said controller to select the same one sensor integration time based on said image data producing saturation and target tracking in the system.

15. The system of claim 10, wherein said controller to select the same one sensor integration time based on said image data including non-target data producing saturation and no target tracking in the system.

16. The system of claim 10, wherein said controller to select a different sensor integration time based on said image data including non-target data producing saturation and no target tracking in the system.

17. The system of claim 10, wherein said sensor to output image data using one of a discrete set of less than five sensor integration times wherein each integration time being associated with a corresponding temperature range.

18. The system of claim 10, wherein said controller to select the same one or a different sensor integration time to produce a predetermined sensor sensitivity and sensor target detection range based on said image data satisfying said at least one predetermined threshold.

19. A machine-readable medium having stored thereon a plurality of executable instructions, the plurality of instructions comprising instructions to:

determine whether received image data, generated and output from a sensor using one of a discrete set of sensor integration times wherein each integration time being associated with a corresponding temperature range, satisfies at least one predetermined threshold; and select the same one or a different sensor integration time for a succeeding frame of image data to produce a predetermined sensor sensitivity based on said image data satisfying said at least one predetermined threshold.

20. The medium of claim 19, wherein said plurality of executable instructions include further instructions to select the same one or a different sensor integration time based on said image data not producing saturation in the system.

21. The system of claim 20, wherein said plurality of executable instructions include further instructions to select the same one sensor integration time based on predicting saturation being produced in the receiving system from a succeeding frame of said image data.

22. The system of claim 20, wherein said plurality of executable instructions include further instructions to select a different sensor integration time based on predicting saturation not being produced in the receiving system from a succeeding frame of said image data.

23. The system of claim 19, wherein said plurality of executable instructions include further instructions to select the same one sensor integration time based on said image data producing saturation and target tracking in the system.

24. The system of claim 19, wherein said plurality of executable instructions include further instructions to select the same one sensor integration time based on said image data including non-target data producing saturation and no target tracking in the system.

25. The system of claim 19, wherein said plurality of executable instructions include further instructions to output image data using one of a discrete set of less than five sensor integration times wherein each integration time being associated with a corresponding temperature range.

26. The system of claim 19, wherein said plurality of executable instructions include further instructions to select the same one or a different sensor integration time to produce a predetermined sensor sensitivity and sensor target detection range based on said image data satisfying said at least one predetermined threshold.

* * * * *